United States Patent
Baldwin et al.

(10) Patent No.: US 6,220,152 B1
(45) Date of Patent: Apr. 24, 2001

(54) BARBEQUE ROTISSERIE ENCLOSURE

(76) Inventors: Chris Baldwin, 97 Teal Ave, Stoney Creek Ontario (CA), L8E 3B5; Mike Lobelio, 662 Dunn Ave., Hamilton Ontario (CA), L8H 6M6

(*) Notice: Subject to any disclaimer, the term of this patent is extended or adjusted under 35 U.S.C. 154(b) by 0 days.

(21) Appl. No.: 09/468,587

(22) Filed: Dec. 21, 1999

Related U.S. Application Data (60) Provisional application No. 60/113,815, filed on Dec. 23, 1998.

(51) Int. Cl.$^7$ ............................. A47J 37/04; A47J 43/18
(52) U.S. Cl. ...................... 99/427; 99/419; 99/441
(58) Field of Search ...................... 99/426, 427, 419, 99/421 H, 441

(56) References Cited

U.S. PATENT DOCUMENTS

| | | | |
|---|---|---|---|
| 1,460,248 | * 6/1923 | Kott | 99/427 |
| 3,215,338 | * 11/1965 | Schirmer | 99/441 X |
| 3,529,536 | * 9/1970 | Milhem | 99/421 H X |
| 4,177,721 | 12/1979 | Redhead | 99/345 |
| 4,612,851 | 9/1986 | McManus | 99/419 |
| 5,355,778 | 10/1994 | Mayfield | 99/441 |
| 5,497,697 | 3/1996 | Promny | 99/441 |

* cited by examiner

Primary Examiner—Reginald L. Alexander (57) ABSTRACT

A barbeque rotisserie enclosure includes a hollow vessel for substantially releasably encapsulating food to be barbequed. The hollow vessel includes a hollow cylinder having a first closed end and a second open end the second open end for placing food into the hollow cylinder and the first closed end being permanently sealed with a first end cap. The second open end is releasably sealed with a second end cap; wherein the hollow vessel is capable of being rotated over a heat source. The barbeque rotisserie enclosure further includes a baffle housed concentrically within and adjacent to an inner surface of the hollow cylinder, thereby preventing direct contact of flames with the food and also substantially preventing direct contact of liquids emanating from the food with the heat source.

8 Claims, 8 Drawing Sheets

BARBEQUE ROTISSERIE ENCLOSURE

This application claims the benefit of U.S. Provisional Application No. 60/113,815, filed Dec. 23, 1998.

FIELD OF THE INVENTION

The present invention relates to improvements and devices for use as a barbeque rotisserie enclosure.

BACKGROUND OF THE INVENTION

Barbeque rotisserie enclosures and tumble baskets for use with barbeque rotisseries are well known in the art. The most common type is a chrome plated wire basket having a generally hexagonal cross-section. Such baskets have identical halves and when assembled on the spit of a rotisserie. The basket is secured on the spit and the spit must be removed to open the basket.

U.S. Pat. No. 5,497,697 dated Mar. 12, 1996 by Lech Promny describes an improved tumbler basket for use with a rotisserie. The tumbler basket described uses a tumbler basket material which is perforated and/or screened.

Similarly in U.S. Pat. No. 5,355,778 titled Hand Held Rotatable Food Roasting Apparatus by Alfred B. Mayfield dated Oct. 18, 1994 describes a Hand Held Rotatable Food Roasting Apparatus which is used for supporting food over campfires or the like. The roasting apparatus described in this patent again uses either a screened or perforated material in which the food is placed on.

The disadvantages of using a perforated and/or screen material for a barbeque rotisserie tumbler basket is that the food first of all is exposed to a great deal of air which increases the likelihood of the food being burned. The second disadvantage with these perforated and/or screened tumbler baskets is that the juices of the food are lost and/or dripped into the barbeque, therefore some of the flavour of the food is lost through the loss of these juices. Accordingly there is need for a tumbler basket which substantially encapsulates or encloses food within the tumbler basket for preventing direct contact with the heat source and also minimizing the amount of air which the food is exposed to.

SUMMARY OF THE INVENTION

The present invention a barbeque rotisserie enclosure comprises a means for substantially releasably encapsulating food to be barbequed wherein said encapsulating means being adapted to rotate over a heat source.

Preferably said encapsulating means comprising a hollow vessel having an opening for placement of food therein; a means for releasably closing said opening thereby encapsulating the food within the hollow vessel; a means for venting excess pressure from vessel; and a means for attaching said barbeque rotisserie enclosure to commercially available rotisserie rotating drives.

Preferably said hollow vessel comprises a hollow longitudinal tubular vessel having a first closed end and a second open end said open end for placing food into said longitudinal tubular vessel; and said closing means comprising a closure for releasably closing off said second open end thereby substantially encapsulating said food within said barbeque rotisserie enclosure.

Preferably said attaching means comprising a shaft aligned along a longitudinal axis of said hollow longitudinal tubular vessel which is adapted to connect to commercially available rotisserie drives.

Preferably said hollow longitudinal tubular vessel comprising a hollow cylinder having a first closed end and second open end; and said closure comprises an end cap for sealing off said open end of said hollow cylinder.

Preferably said hollow longitudinal tubular vessel comprising a hollow cylinder wherein said first closed end sealed with an first end cap, and said second open end releasably sealed with a closure being a second end cap; said venting means including a first vent hole in first end cap and a second vent hole in second end cap and said attaching means includes a first shaft connected a said first end cap and a second shaft connected to said second end cap; wherein said shafts are adapted to be connected to commercially available barbeque rotisserie drives; and said hollow vessel further including a baffle housed concentrically within and adjacent to a inner surface said hollow cylinder, said baffle including perforations allowing liquids to pass there through.

A second embodiment of the present invention a disposable barbeque rotisserie enclosure comprises a means for substantially encapsulating food to be barbequed made of disposable material; and said encapsulating means adapted to be mounted on a standard barbeque rotisserie spit.

Preferably the disposable barbeque rotisserie enclosure comprises a first and second hollow body adapted to be joined together, wherein food is placed into one or both of said hollow bodies prior to joining said bodies together, thereby substantially encapsulating said food within said joined together hollow bodies and a means for joining said hollow bodies together including a first flange on said first hollow body and a second flange on said second hollow body, wherein the first and second hollow bodies are joined together manually by crimping the first flange over the second flange.

Preferably said encapsulating means comprises a first and second hollow body adapted to be joined together, wherein food is placed into one of said hollow bodies prior to joining said bodies together, thereby substantially encapsulating said food within said joined together hollow bodies and a means for joining said hollow bodies together wherein the second hollow body fits slidably over said first hollow body thereby substantially encapsulating the contents housed with the hollow bodies.

Preferably said hollow bodies are made from thin foil.

BRIEF DESCRIPTION OF THE DRAWINGS

The invention will now be described by way of example only, with references to the following drawings in which.

DETAILED DESCRIPTION OF THE PREFERRED EMBODIMENT

The first preferred embodiment of the present invention a Barbeque Rotisserie Enclosure showing generally as 10 in FIGS. 1 through 8. Barbeque Rotisserie Enclosure 10 is comprised of a cylinder 12 having a first end 14 and second end 16, a first end cap 18 having a first shaft 22 a second end cap 20 having a second shaft 24. First shaft 22 and second shaft 24 are connected to first and second collars 31 and 25 with first and second thumb screws 33 and 35. Optionally baffle 32 having perforations 34 can be used with barbeque rotisserie enclosure 10.

First end cap 18 and second end cap 20 are slidably received on first end 14 and second end 16 respectively of cylinder 12. As shown in FIGS. 1 through 8 end caps 18 and 20 are shown as a slidable fit over first and second ends 14 and 16 of cylinder 12. Any other means known in the art for attaching end caps 18 and 20 to cylinder 12 such as threadably screwing onto cylinder 12, friction fitting, male and female socketing, tongue and grooving, dove tailing and/or any other means known to a person skilled in the art for attaching end cap 18 and 20 to cylinder 12 can be applied to barbeque rotisserie enclosure 10.

Figures 3, 4:
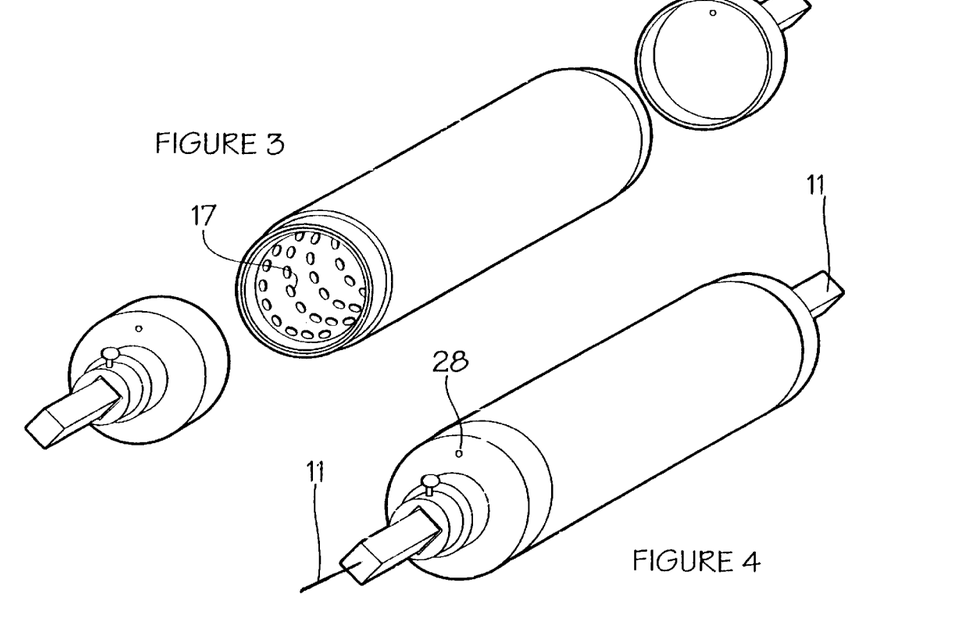
FIG. 3 is an exploded partially assembled perspective view of barbeque rotisserie enclosure.
FIG. 4 is an assembled perspective view of the barbeque rotisserie enclosure.

FIG. 3 shows baffle 32 placed in side of cylinder 12 with end caps 18 and 20 in exploded fashion. FIG. 4 shows barbeque rotisserie enclosure 10 in its assembled condition. Preferably end caps 18 and 20 have defined therein first vent 26 and second vent 28 which are holes allowing the escape of gases from the interior of cylinder 12.

Figures 1, 2:
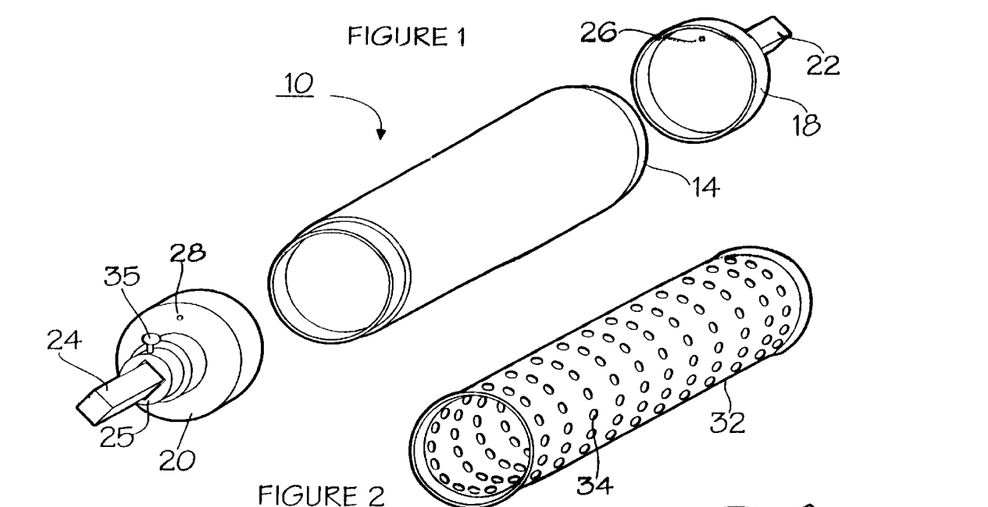
FIG. 1 is a exploded perspective view of barbeque rotisserie enclosure.
FIG. 2 is a perspective view of barbeque rotisserie baffle.

First end cap 18 and second end cap 20 and first and second collars 31 and 25 are adapted to slidably receive first and second shafts along longitudinal axis 11.

Figure 5:
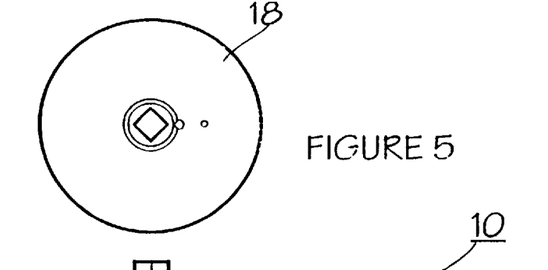
FIG. 5 is a elevational view of first end cap 18.
Figure 6:
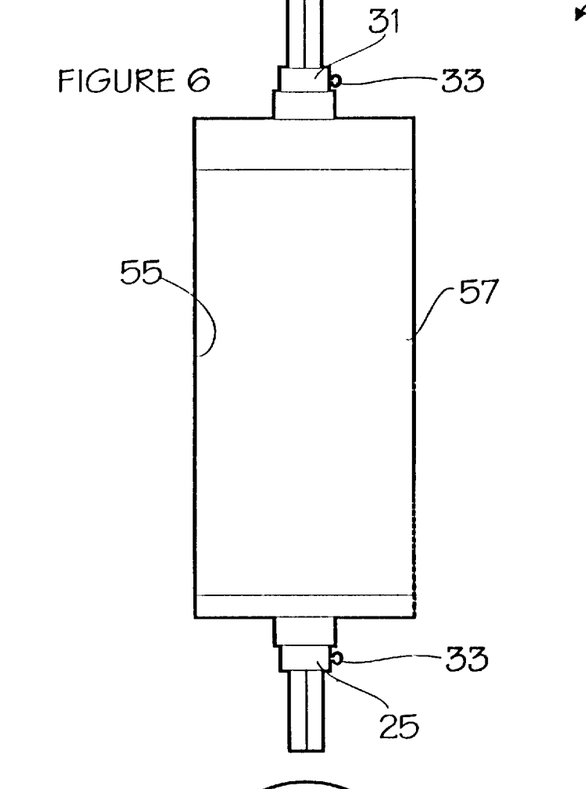
FIG. 6 is a cross-sectional assembled view of the barbeque rotisserie enclosure.
Figure 7:
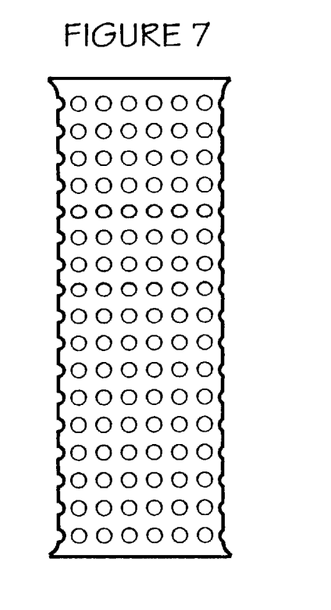
FIG. 7 is a cross-sectional longitudinal view of the baffle.
Figure 8:
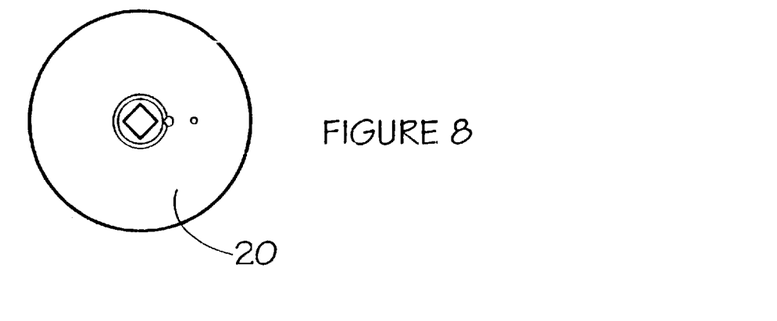
FIG. 8 is a elevational end plan view of second end cap 20.
Figures 9, 10:
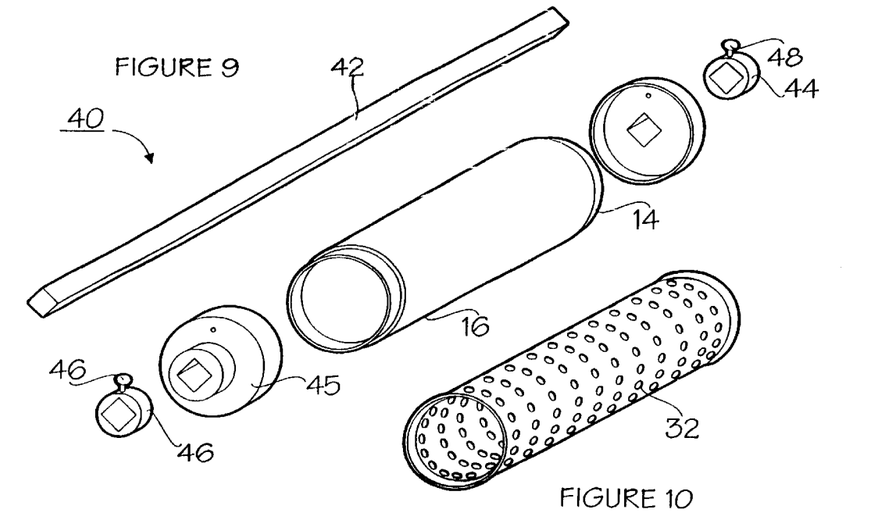
FIG. 9 is an exploded perspective view of the second embodiment of barbeque rotisserie enclosure.
FIG. 10 is a perspective view of the baffle for the barbeque rotisserie enclosure.

FIGS. 5 through 8 shows the various components in cross-section. In particular FIG. 5 shows first end cap 18 in plan elevational view, and FIG. 8 shows second end cap 20 in plan elevational view. FIG. 7 shows baffle 32 in cross-sectional view and FIG. 6 shows the assembled barbeque rotisserie enclosure 10 in cross-sectional view having mounted thereon end caps 18 and 20 as well as first and second shafts 22 and 24 and first and second collars 31 and 25 as well as first and second thumb screws 33 and 35. First and second shafts 22 and 24 are adapted to be used with commercial available rotisserie drive mechanisms. In particular shafts 22 and 24 as shown in the diagrams are square in cross section, however it is possible to have round shafts and/or any other configuration. Commercially available drives generally are connectable to square shafts as shown in FIGS. 1 through 8, however, shafts 22 and 24 can be adapted for use with any other rotating rotisserie drives available.

Referring now to FIGS. 9 through 16 the second preferred embodiment shown generally as 40 a barbeque rotisserie enclosure has substantially the same parts as barbeque rotisserie enclosure 10 except for the addition of a continuous longitudinal spit 42 which is attached to one end to first collar 44 and at the other end to second collar 46 having first thumb screw 48 and second thumb screw 50 respectively. First end cap 43 and second end cap 45 are suitably modified to accept there through spit 42 which is mounted along longitudinal axis 41 as shown in the assembled condition in FIG. 12. Optionally baffle 32 can also be used with cylinder 12 as with barbeque rotisserie enclosure 10.

Figure 14:
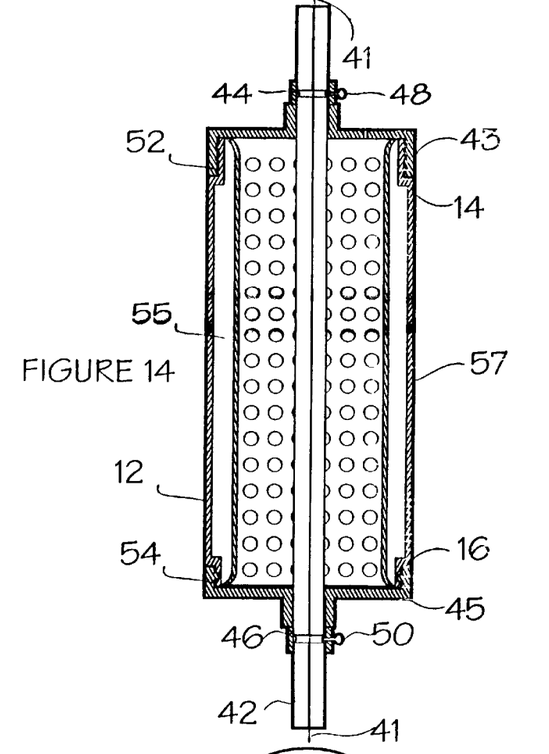
FIG. 14 is a longitudinal cross-sectional view of the assembled barbeque rotisserie enclosure shown in FIG. 9.
Figure 15:
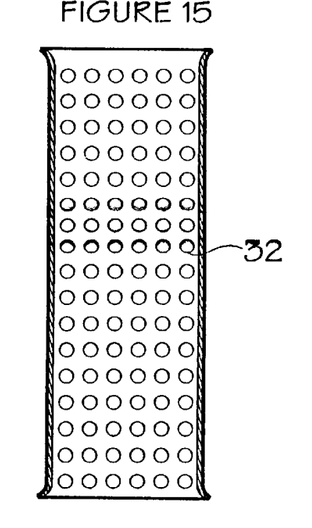
FIG. 15 is a cross-sectional longitudinal view of the baffle shown in FIG. 10.
Figure 16:
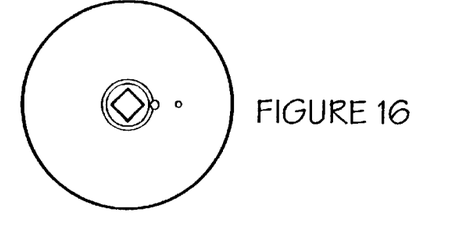
FIG. 16 is a plan elevational end view of second end cap 45 shown in FIG. 9.

As shown in FIG. 14 baffle 32 preferably extends the entire length of cylinder 32 and is supported by the inner surface 55 of cylinder 12 near the cylinder ends. FIGS. 13 through 16 show in cross-sectional view the various components of barbeque rotisserie enclosure 40 and in particular shows the details of the connection of the end caps with cylinder 12. Looking at FIG. 14 it is apparent that first end cap 43 is connected to cylinder 12 with screw threads 52. Second end cap 45 on the other hand is connected to cylinder 12 with the use of a snap-on tab and recess connection 54. Any other means of connecting end caps 43 and 45 to cylinder 12 known in the art can be applied to barbeque rotisserie enclosure 40. In any event end caps 45 and 43 are held in position when barbeque rotisserie enclosure 40 is in the assembled condition with first and second collars 44 and 46 by screwing down first and second thumb screw 48 and 50 onto spit 42.

The major difference between barbeque rotisserie enclosure 10 and barbeque rotisserie enclosure 40 is the use of a one piece longitudinal spit 42 which is mounted along longitudinal axis 42 and extends the entire length of the interior of cylinder 12 thereby decreasing the usable volume of cylinder 12. This is less preferable than barbeque rotisserie enclosure 10 wherein first and second shafts 22 and 24 do not extend into the interior of cylinder 12 thereby increasing the usable volume of the interior of cylinder 12.

Figures 17, 18:
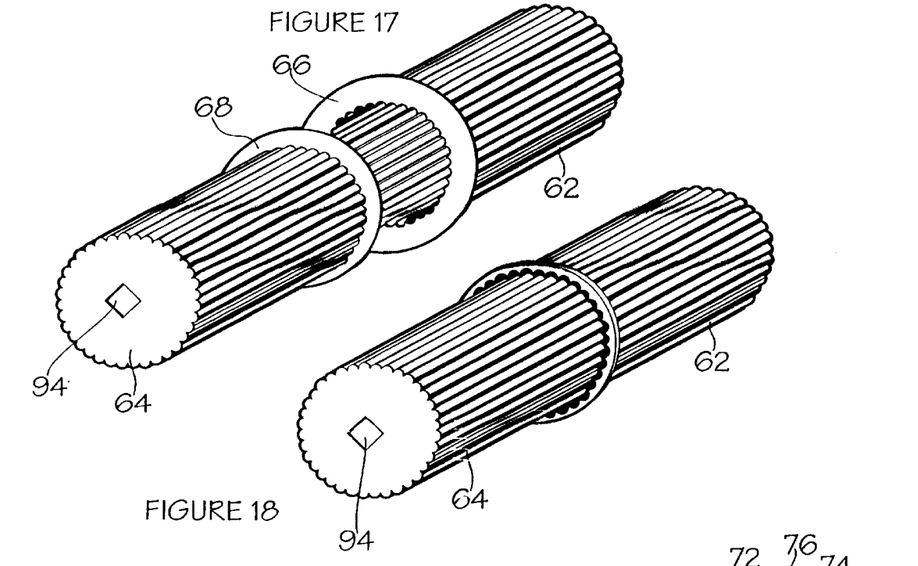
FIG. 17 is a perspective exploded view of an alternative embodiment of the present invention, a disposable barbeque rotisserie enclosure.
FIG. 18 is a assembled perspective view of the disposable barbeque rotisserie enclosure shown in FIG. 17.
Figure 19:
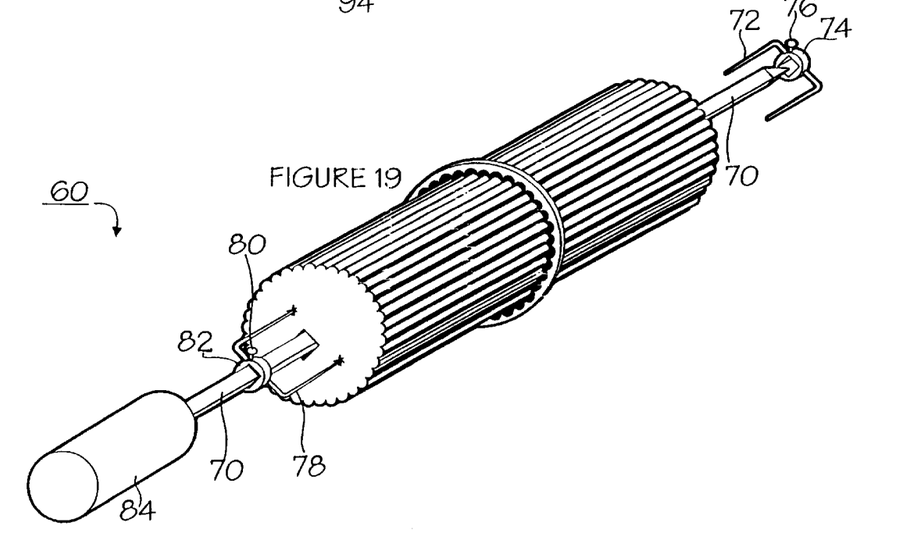
FIG. 19 is a perspective view of the disposable barbeque rotisserie enclosure being mounted on a spit.
Figure 20:
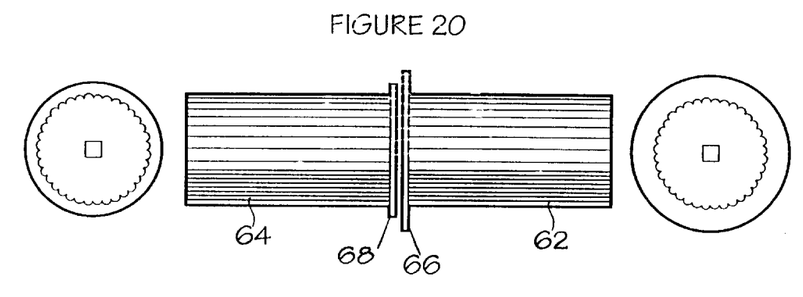
FIG. 20 is an unassembled cross-sectional view taken along the longitudinal length of the disposable barbeque rotisserie enclosure shown in FIG. 16 along with elevational plan end views of each body.
Figure 21:
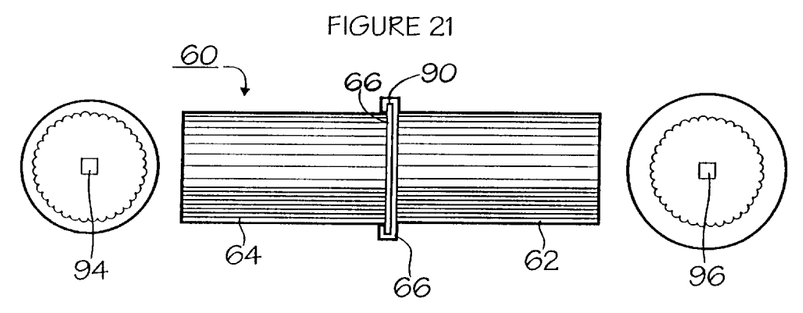
FIG. 21 is a an assembled cross-sectional view of the disposable barbeque rotisserie enclosure shown with crimped flanges as well as plan elevational view of each end.
Figure 22:
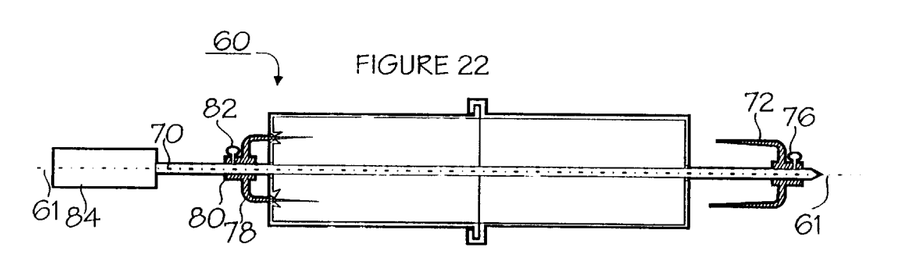
FIG. 22 is a schematic assembled cross-sectional view showing the mounting of a disposable barbeque rotisserie enclosure onto a spit.
Figures 23, 24, 25:
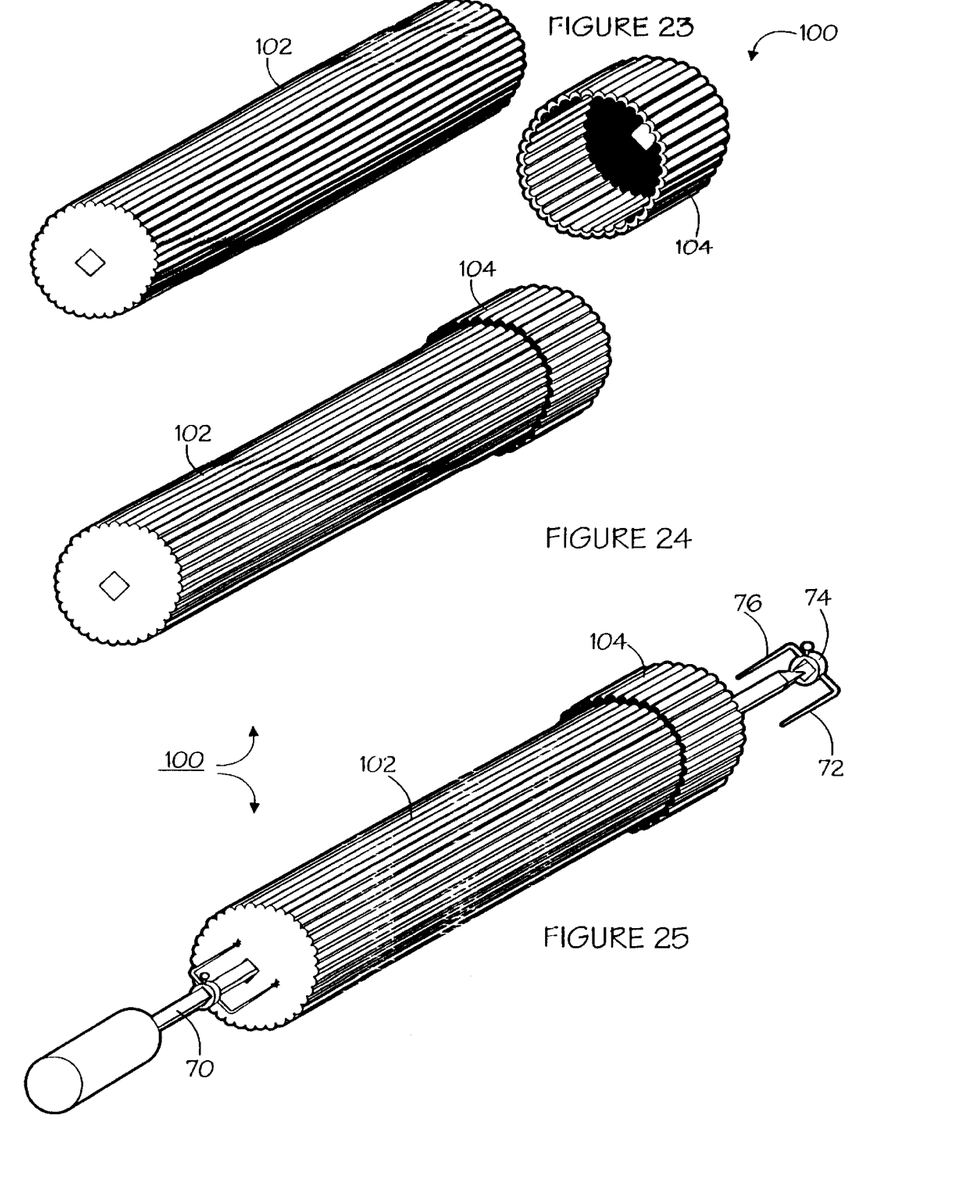
FIG. 23 is an exploded perspective unassembled view of an alternative embodiment of the present invention, a disposable barbeque rotisserie enclosure.
FIG. 24 is an assembled perspective view of the disposable barbeque rotisserie enclosure shown in FIG. 23.
FIG. 25 is a perspective view of the disposable barbeque rotisserie enclosure shown being mounted on a spit.

Referring now to FIGS. 17 through 22 a third preferred embodiment shown generally as 60, a disposable barbeque rotisserie enclosure comprises a first body 62, second body 64, first flange 66 and second flange 68. First flange 66 and second flange 68 are adapted to align and mate together as shown in FIGS. 18 and 22. FIG. 18 shows body 62 and 64 in the assembled condition whereby first flange 66 is manually crimped over second flange 68 to connect first body 62 to second body 64. FIG. 19 shows disposable barbeque rotisserie enclosure 60 mounted onto a commercially available spit 70 having first and second grip 72 and 78 which are mounted on to spit 70 with first and second collars 74 and 80 and first and second thumb screws 76 and 82. FIGS. 20 to 22 show in cross-section the disposable barbeque rotisserie enclosure 60. FIG. 20 shows the components in the disassembled state FIG. 21 shows how flanges 66 and 68 are crimped together to connect first body 62 with second body 64 and FIG. 22 shows how disposable barbeque rotisserie enclosure 60 is mounted onto spit 70 having first and second grips 72 and 78.

First and second body 62 and 64 are preferably made of a thin foil material which allows manually crimping first flanges 66 over first flange 68 to form the connection shown in FIG. 21. Additionally, using a thin foil first and second body 62 and 64 allows for piercing and penetration of grip 72 and 78 into first and second bodies respectively in order to mount barbeque rotisserie enclosure 60 onto a commercially available spit 70 having first and second grip 72 and 78. As shown in the Figures first and second body 62 and 64 have first and second apertures 96 and 94 respectively which are dimensioned to receive spit 70 there through. It is also possible to have first and second body 62 and 64 with totally closed ends wherein spit 70 just penetrates through the ends of first body 62 and 68 similar to grip 72 and 78 piercing through the ends of first and second body 62 and 64.

Referring now to FIGS. 23 through 28 which is another preferred embodiment of a disposable barbeque rotisserie enclosure shown generally as 100 and having similar components as the disposable barbeque rotisserie enclosure shown generally as 60. Disposable barbeque rotisserie enclosure 100 comprises a first body 102, a second body 104 and the balance of the components are essentially identical to disposable barbeque rotisserie enclosure 60. The major differences between disposable barbeque rotisserie enclosure 100 and 60 is that the first body 102 extends substantially along the entire longitudinal length of the enclosure, and second body 104 is essentially an end cap which closes off first body 102. The connection between first body 102 and 104 can be a slidable connection or a friction fit a screw fit, lock and tab, crimp fit, or any other means known in the art which can be utilized to connect first body 102 with second body 104.

Figure 26:
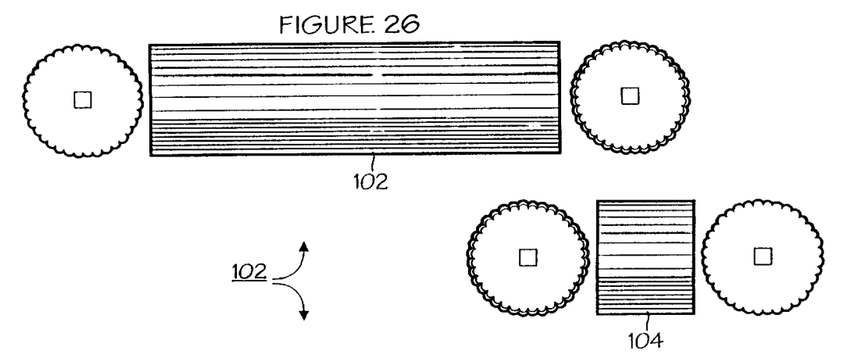
FIG. 26 is a cross-sectional longitudinal view including plan elevational end view of the disposable barbeque rotisserie enclosure shown in FIG. 24.
Figure 27:
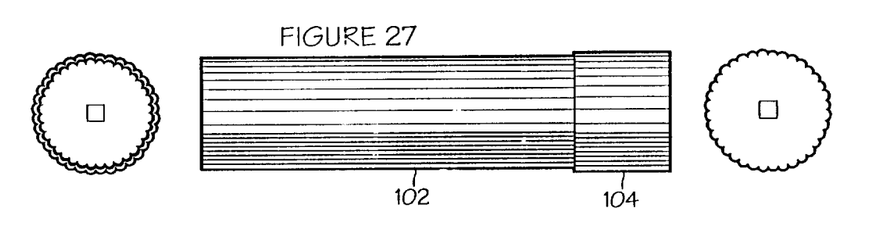
FIG. 27 is an assembled cross-sectional longitudinal view including a plan elevational end view of the barbeque rotisserie enclosure shown in FIG. 24.
Figure 28:
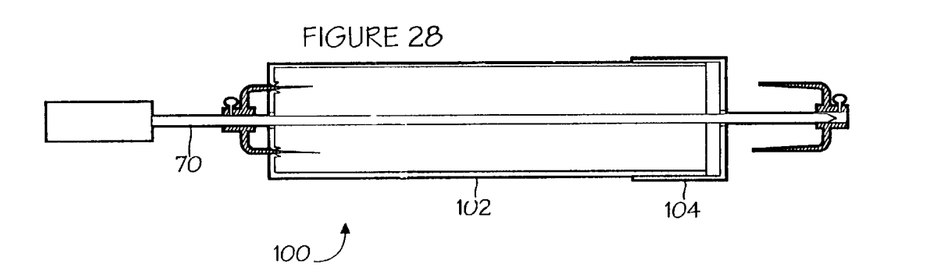
FIG. 28 is a cross-sectional perspective view showing the disposable barbeque rotisserie enclosure being mounted onto a spit.

Bodies 102 and 104 as in the previous embodiment are preferably made of a thin foil material to allow piercing of grips 72 and 78 and optionally piercing of spit 70 also through first and second bodies 102 and 104. FIGS. 26 through 28 show the disposable barbeque rotisserie enclosure 100 in the unassembled form in FIG. 26 and assembled together in FIG. 27 and assembled and mounted on a spit in FIG. 28.

In use barbeque rotisserie enclosure 10 is used in conjunction with a heat source such as a gas barbeque and/or open barbeque and/or open fire in order to barbeque various food items. Disposable barbeque rotisserie enclosure 10 is assembled by firstly placing first end cap 18 on to cylinder 12. Once first end cap 18 is in place it preferably can no longer be removed from cylinder 12. Optionally first end cap 18 may in fact be removable from cylinder 12. Once first end cap 18 is mounted on to first end 14 of cylinder 12 food items (not shown) to be barbequed are placed within the internal space defined by the interior 17 of cylinder 12. Food such as meat, vegetables, potatoes and any other kind of barbequeable food which can physically be housed within interior 17 of cylinder 12 can be placed within barbeque rotisserie enclosure 10.

Optionally baffle 32 can be used by inserting into cylinder 12, prior to the placement of food into cylinder 12. Baffle 32 which preferably has perforations 34 helps drain away any juices which are generated during the barbequing process. Once the food is in place second end cap 20 is installed onto cylinder 12. Shafts 22 and 24 can be removably installed onto first and second end caps 18 and 20 and are locked in place with thumb screws 31 and 35.

First and second shaft 22 and 24 are adapted to be connected to commercially available barbeque rotisserie drives which re not shown in the attached drawings. Commercially available barbeque rotisserie drives generally have a square socket into which the shaft end fits. This square socket is rotated in order to rotate the barbeque rotisserie enclosure 10 above the source of heat.

In addition, preferably there is a first vent 26 and second vent 28 for the escape of gases from cylinder 12 located in first and second end caps 18 and 20 for preventing the build-up of excess pressure within cylinder 12 while the contents of the cylinder are being heated.

The advantages of the present barbeque rotisserie enclosure 10 is that there is very little direct contact of the flames with the food that is to be barbequed. In addition, the amount of air that comes into contact with the food is minimized and therefore this minimizes or eliminates the possibility of burning the contents that are being barbequed and as well the natural juices from the food are retained within the barbeque vessel thereby ensuring that the food contents being barbequed remain as moist and flavourful as possible.

Figures 11, 12:
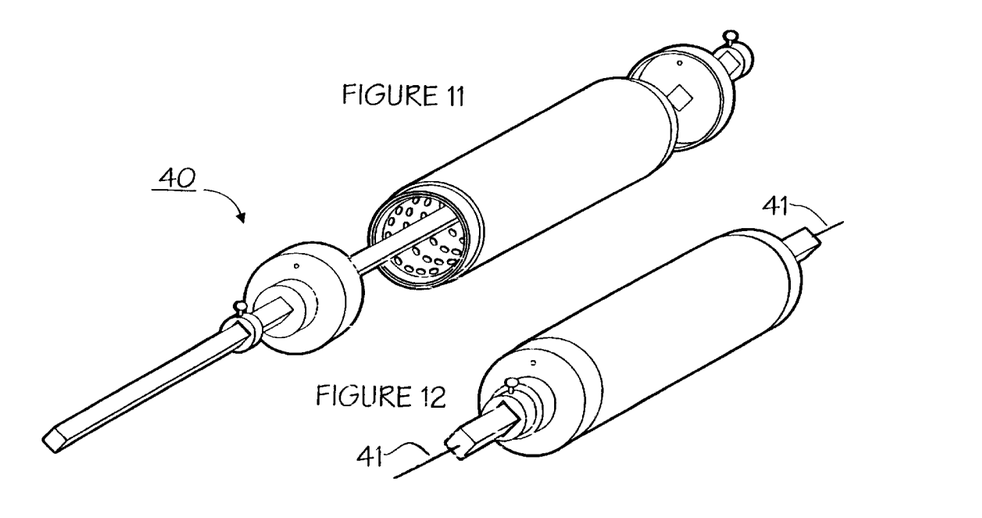
FIG. 11 is an exploded partially assembled perspective view of the barbeque rotisserie enclosure shown in FIG. 9.
FIG. 12 is a assembled perspective view of the barbeque enclosure shown in FIG. 9.
Figure 13:
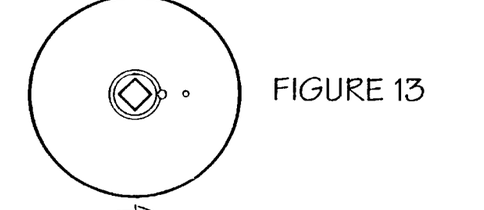
FIG. 13 is a plan elevational view of first end cap of the barbeque rotisserie enclosure.

The embodiment shown in FIGS. 9 through 16 shown generally as barbeque rotisserie enclosure 40 is generally operated the same way as described for barbeque rotisserie enclosure 10 other than the shafts 24 and 22 are essentially replaced by spit 42 which extends along the entire longitudinal axis 41 shown in FIG. 12. This particular embodiment is less preferable than the previous since spit 42 takes up a certain amount of space within cylinder 12, thereby limiting the amount and size of food which can be placed within cylinder 12.

Also barbeque rotisserie enclosure 40 preferably has separate collars 46 and 44 from end caps 43 and 45 due to the construction of this particular embodiment. Again first end cap 43 is preferably permanently installed over cylinder 12. Collars 46 and 44 may in fact be integrally part of first and second end caps 43 and 45.

In either embodiment once the barbequing process is completed, second end cap 20 or second end cap 45 which ever the case may be is removed and the food contents of cylinder 12 can than be emptied for serving.

Referring now to FIGS. 17 through 22 which teaches a disposable barbeque rotisserie enclosure shown generally as 60, this embodiment has a first body 62 and a second body 64 which can be mated together and manually interlocked by folding over first flange 64 over second flange 68. First body 62 is preferably made of a thin aluminum foil and the contents of the food to be barbequed is placed into the interior of first body 62 and can also be placed into the interior of second body 64. After closing first and second body 62 and 64 together (which are adapted to mate together in the centre as shown in FIGS. 18 and 21) the flange 66 is manually folded over onto flange 68 for holding together first and second body 62 and 64. Thereafter, spit 70 is placed through apertures 94 and 96 in first and second bodies 62 and 64 and thereafter grip 78 and 72 are placed through the ends of first and second body 62 and 64 and pierce through the thin foil of these bodies. Again the spit 70 can be connected to a drive mechanism for rotating the disposable barbeque rotisserie enclosure 60 over a source of heat. In FIG. 19 for example a drive attachment 84 is shown, however, any other method known in the art for rotating a barbeque rotisserie can be used.

After barbequing the first and second bodies 62 and 64 can be destroyed and discarded and the food therein recovered for serving.

Finally the last embodiment show in FIGS. 23 through 28 is similar to the previous, however first body 102 is longer and essentially takes up the entire longitudinal length of the disposable barbeque rotisserie enclosure. Food is placed in the first body 102 thereafter it is sealed by placing second body 104 over the end of first body 102. Second body 104 normally is shown as a sliding fit over 102, however a screw fit, friction fit, crimp fit, or any other means or methods known in the art for joining such bodies can be used. Similar to the previous embodiment, once the food and the second body 104 is placed over the end of first body 102, the food is substantially encapsulated by the disposable barbeque rotisserie enclosure and spit 70 is placed through the body and again grip 72 and 78 are positioned to pierce through the ends of the body in order to stabilize and be able to rotate effectively the disposable barbeque rotisserie enclosure. After barbequing the bodies 102 and 104 can be discarded, and the food recovered for serving.

It should be apparent to persons skilled in the arts that various modifications and adaptation of this structure described above are possible without departure from the spirit of the invention the scope of which defined in the appended claim.

What is claimed is:

1. A barbeque rotisserie enclosure comprising:
   (a) a means for substantially releasably encapsulating food to be barbequed wherein said encapsulating means being capable of being adapted to rotate over a heat source, wherein said encapsulating means preventing direct contact of flames with the food and also substantially preventing direct contact of liquids emanating from the food with the beat source;
   wherein said encapsulating means comprising:
   (b) a hollow vessel having an opening for placement of food therein;
   (c) a means for releasably closing said opening thereby encapslating the food within the hollow vessel;
   (d) a means for venting excess pressure from vessel;
   (e) a means for attaching said barbeque rotisserie enclosure to rotisserie rotating drives; and
   (f) said hollow vessel further including a baffle housed concentrically within and adjacent to an inner surface of said hollow cylinder for placement of food within said baffle, and said baffle including perforations allowing liquids to pass there through.

2. The barbeque rotisserie enclosure claimed in claim 1, wherein:
   (a) said hollow vessel comprises a hollow cylinder having a first closed end and a second open end said open end for placing food into said hollow cylinder.

3. The barbeque rotisserie enclosure claimed in claim 2 wherein:
   (a) said first closed end being permanently sealed with a first end cap, and said second open end being releasably sealed with a second end cap;
   (b) said venting means including at least one vent hole; and
   (c) said attaching means includes a first shaft connected to said first end cap and a second shaft connected to said end cap; wherein said shafts are longitudinally aligned, do not extend into the interior of said hollow cylinder and are adapted to be connected to commercially available barbeque rotisserie drives.

4. The barbeque rotisserie enclosure claimed in claim 2, wherein said attaching means comprising a shaft aligned along a longitudinal axis of said hollow longitudinal tubular vessel and is adapted to connect to commercially available rotisserie drives.

5. A disposable barbeque rotisserie enclosure comprising:
   (a) a means for substantially encapsulating food to be barbequed made of disposable material and being capable of being adapted to rotate over a heat source, wherein said encapsulating means preventing direct contact of flames with the food and also substantially preventing direct contact of liquids emanating from the food with the heat source; and
   (b) said encapsulating means adapted to be mounted on a conventional barbeque rotisserie spit;
   wherein said encapsulating means further comprises:
   (c) a first and second hollow body adapted to be joined together, wherein food is placed into one or both of said hollow bodies prior to joining said bodies together, thereby substantially encapsulating said food within said joined together hollow bodies; and
   (d) a means for joining said hollow bodies together including a first flange on said first hollow body and a second flange on said second hollow body, wherein the first and second hollow bodies are joined together manually by crimping and bending the first flange over the second flange.

6. A disposable barbeque rotisserie enclosure claimed in claim 5 wherein said enclosure is made from a material capable of being pierced and gripped by the tips found on a conventional barbeque rotisserie spit.

7. A disposable barbeque rotisserie enclosure comprising:
   (a) a means for substantially encapsulating food to be barbequed made of disposable material and being capable of being adapted to rotate over a heat source, wherein said encapsulating means preventing direct contact of flames with the food and also substantially preventing direct contact of liquids emanating from the food with the heat source; and
   (b) said encapsulating means adapted to be mounted on a conventional barbeque rotisserie spit;
   wherein said encapsulating means comprises
   (c) a first and second hollow body adapted to be joined together, wherein food is placed into one of said hollow bodies prior to joining said bodies together, thereby substantially encapsulating said food within said joined together hollow bodies; and,
   (d) a means for joining said hollow bodies together wherein the second hollow body is dimensioned to snugly fit slidably over said first hollow body thereby substantially encapsulating the contents housed with the hollow bodies.

8. A disposable barbeque rotisserie enclosure claimed in claim 7 wherein said enclosure is made from a material capable of being pierced and gripped by the tips found on a conventional barbeque rotisserie spit.

* * * * *